US008092298B2

(12) United States Patent
Gauselmann

(10) Patent No.: US 8,092,298 B2
(45) Date of Patent: Jan. 10, 2012

(54) MULTIPLE PROGRESSIVE JACKPOTS FOR A GAMING DEVICE

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 388 days.

(21) Appl. No.: 12/504,629

(22) Filed: Jul. 16, 2009

(65) Prior Publication Data

US 2009/0298574 A1 Dec. 3, 2009

Related U.S. Application Data

(62) Division of application No. 10/655,957, filed on Sep. 5, 2003, now Pat. No. 7,578,739.

(51) Int. Cl.
*A63F 13/00* (2006.01)
*A63F 13/10* (2006.01)

(52) U.S. Cl. ................ 463/20; 463/16; 463/21; 463/26; 463/27; 273/138.1; 273/139; 273/461

(58) Field of Classification Search .......... 463/1, 16–22, 463/24–29, 33, 42–43, 47; 273/138.1, 138.2, 273/139, 141 A, 269, 454–456, 460–461; *A63F 13/00, 13/10*
See application file for complete search history.

(56) References Cited

U.S. PATENT DOCUMENTS 4,856,787 A 8/1989 Itkis
5,042,810 A 8/1991 Williams
5,542,669 A 8/1996 Charron et al.
5,630,753 A 5/1997 Fuchs
5,868,619 A * 2/1999 Wood et al. .................... 463/13
5,882,259 A 3/1999 Holmes, Jr. et al.
6,159,097 A 12/2000 Gura
6,159,098 A * 12/2000 Slomiany et al. .............. 463/25
6,190,255 B1 2/2001 Thomas et al.
6,210,275 B1 4/2001 Olsen
6,217,448 B1 4/2001 Olsen
6,311,976 B1 11/2001 Yoseloff et al.
6,322,309 B1 11/2001 Thomas et al.
6,416,409 B1 7/2002 Jordan
6,461,241 B1 10/2002 Webb et al.
6,599,193 B2 7/2003 Baerlocher et al.
6,602,137 B2 * 8/2003 Kaminkow et al. ............ 463/16
6,626,758 B1 9/2003 Parham et al.
6,776,714 B2 8/2004 Ungaro et al.
6,800,026 B2 10/2004 Cannon
6,884,168 B2 4/2005 Wood et al.
6,893,344 B2 5/2005 Brown et al.
6,935,947 B1 8/2005 Singer et al.
7,001,273 B2 2/2006 Baerlocher
7,029,395 B1 4/2006 Baerlocher
7,081,050 B2 7/2006 Tarantino
7,094,150 B2 8/2006 Ungaro et al.
7,252,591 B2 8/2007 Van Asdale
(Continued)

*Primary Examiner* — Arthur O. Hall
(74) *Attorney, Agent, or Firm* — Patent Law Group LLP; Brian D. Ogonowsky

(57) ABSTRACT

A gaming machine is described wherein a player first plays a primary game, such as the spinning and stopping of mechanical or video reels displaying symbols. A plurality of progressive jackpots is displayed to the player, where the progressive jackpots are incremented at different random rates. Upon a jackpot-winning outcome of the primary game, the number of different progressive jackpots paid to the player depends on the number of credits bet by the player. The jackpots are incremented upon jackpot-incrementing symbols being displayed by the reels. In one embodiment, the jackpot above each column of symbols gets incremented upon a special symbol, such as a credit value, being displayed in that column.

21 Claims, 3 Drawing Sheets

U.S. PATENT DOCUMENTS

| | | | | |
|---|---|---|---|---|
| 7,329,180 | B2 | 2/2008 | Strom | |
| 2002/0047238 | A1 | 4/2002 | Ainsworth et al. | |
| 2002/0103021 | A1 | 8/2002 | Wood et al. | |
| 2003/0216165 | A1 | 11/2003 | Singer et al. | |
| 2003/0236116 | A1 * | 12/2003 | Marks et al. | 463/16 |
| 2004/0242311 | A1 | 12/2004 | Haag et al. | |

* cited by examiner

MULTIPLE PROGRESSIVE JACKPOTS FOR A GAMING DEVICE

CROSS-REFERENCE TO RELATED APPLICATIONS

This is a divisional of U.S. application Ser. No. 10/655,957, filed Sep. 5, 2003, now U.S. Pat. No. 7,578,739, entitled Multiple Progressive Jackpots for a Gaming Device, assigned to the present assignee and incorporated herein by reference.

FIELD OF THE INVENTION

This invention relates to gaming devices and, in particular, to a progressive jackpot technique for a gaming device.

BACKGROUND

In a typical progressive jackpot gaming machine, a progressive jackpot is accumulated by allocating a percentage of the wagers to the jackpot. The jackpot is won by video or mechanical reels displaying a special combination of symbols. Typically, a number of gaming machines are linked and share the same jackpot, so the jackpot usually becomes very large.

Since the winning of the jackpot is very infrequent, the players are not particularly motivated to keep playing the machines. Further, since a minimum bet of one credit can win the entire jackpot, the players do not have incentive to bet more than one credit per game.

What is needed is a gaming device that gives the player added incentive to keep playing the device and make higher wagers.

SUMMARY

A gaming machine, also referred to as a slot machine, is described wherein a player first plays a primary game, such as the spinning and stopping of mechanical or video reels displaying symbols. Upon certain special outcomes of the primary game, one or more different progressive jackpots are paid to the player.

In one embodiment, symbols are displayed in a 5×3 array on a video screen so that there are five columns of three symbols. Above each of the five columns is a progressive jackpot amount.

The player is allowed to bet one to five credits, where increasing the bet increases the conventional awards for winning symbol combinations in the primary game. If a special symbol combination occurs, such as five of a kind across an activated payline, then the player wins the number of progressive jackpots corresponding to the number of credits bet for the game. As an example, if the player bets one credit for the game and a jackpot symbol combination occurs in the primary game, the player only wins the first progressive jackpot displayed over the first column of symbols. If the player bets the maximum of five credits, the player wins all five progressive jackpots.

In one embodiment, as the player continues to play, the progressive jackpots are increased based upon various factors such as special symbols being displayed in the primary game. As the displayed progressive jackpots are being filled, hidden jackpots are also being filled based upon any number of factors, such as a percentage of the wagers or a percentage of the visible jackpots. As one or more progressive jackpots are won by the player, the "train" of progressive jackpots shifts so that the hidden jackpots now become visible and are aligned over associated columns of symbols.

The jackpots, being generally lower than conventional progressive jackpots, have a higher probability of winning than conventional progressive jackpots. Thus, players play longer in order to win one or more jackpots. Additionally, the player has an incentive to bet higher amounts in order to win additional jackpots. Thus, the revenue of the gaming machine is increased.

The gaming machine may be a stand-alone machine, a linked machine, an Internet-connected machine, or any other suitable device.

Numerous variations of this multiple progressive jackpot game are described and fall within the scope of the invention.

DETAILED DESCRIPTION

Figure 1:
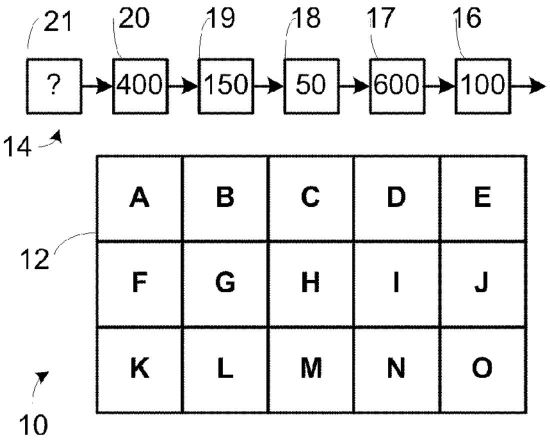
FIG. 1 illustrates a display screen on a video gaming machine, where the primary game is the random selection of a 5×3 array of symbols, and progressive jackpot amounts are accumulated corresponding to each column of symbols.

In FIG. 1, a display screen 10 on a gaming machine displays a primary portion 12 of a game and a progressive jackpot portion 14 of the game. Display screen 10 may be a CRT, a liquid crystal display (LCD), a thin film transistor display, or any other type of display. Alternatively, the primary game may be motor-driven mechanical reels instead of simulated reels on a video screen.

In the example of FIG. 1, the primary game consists of a 5×3 array of symbols that are randomly selected by a random number generator in the machine. Such a random selection emulates a 5×3 array of rotating reels. The outcomes of each of the "reels" are illustrated as symbols A-O. The invention is not limited to the number of symbols displayed. For example, the primary game may consist of three reels displaying from one to three symbols per reel.

Above each column of symbols is a progressive jackpot display 16-20. Each display 16-20 is associated with the column of symbols beneath it.

The first progressive jackpot to fill in for a jackpot that has been won by a player is shown as jackpot 21, to be described in greater detail later. Jackpot 21 may be a hidden or visible jackpot.

Figure 2:
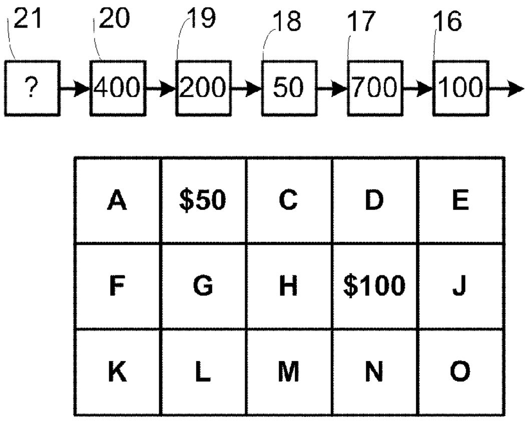
FIG. 2 illustrates how the progressive jackpots in FIG. 1 have been increased by special symbols being displayed in a column associated with a progressive jackpot.

FIG. 2 illustrates how each of the progressive jackpots may be incremented during play. Each column of symbols includes value symbols that, when displayed, increment the jackpot associated with that column by a specified amount. In the example of FIG. 2, the symbols $50 and $100 increment the corresponding jackpots by $50 and $100, respectively. Any other type of symbol for incrementing the jackpots may be used.

If the machine were in a bank of linked machines sharing the same jackpots, any value symbol displayed in the primary games played by each machine in the bank would increment the corresponding jackpot for all the machines in the bank.

Additionally, the progressive jackpots displayed to the player, and any hidden jackpots, may also be incremented based upon the wagers of the player playing the machine or the combined wagers of players playing linked machines.

Accordingly, as the player continues to play the primary game, the jackpot amounts are increased, thus adding excitement and giving the player the feeling that she has invested in the machine. Since the jackpots may be awarded more frequently than conventional progressive jackpot amounts, the players sense that they have a reasonable chance of winning one or more jackpots. The player will thus continue to play in order to get her investment back in the form of a jackpot win.

In a machine linked to other machines that share the same jackpots, the jackpots do not change when a player cashes out. For a stand-alone gaming machine that is not linked, it may not be desirable to keep the progressive jackpots the same when the player cashes out or else potential players may only want to play those machines that have large accumulated progressive jackpots. Therefore, in a stand-alone machine, each jackpot 16-20 may have a different default starting amount based upon any number of factors, where the starting amounts for the jackpots are displayed after a player cashes out of the machine. Alternatively, the jackpot amounts for a stand-alone machine are not reduced after a player cashes out.

Figure 3:
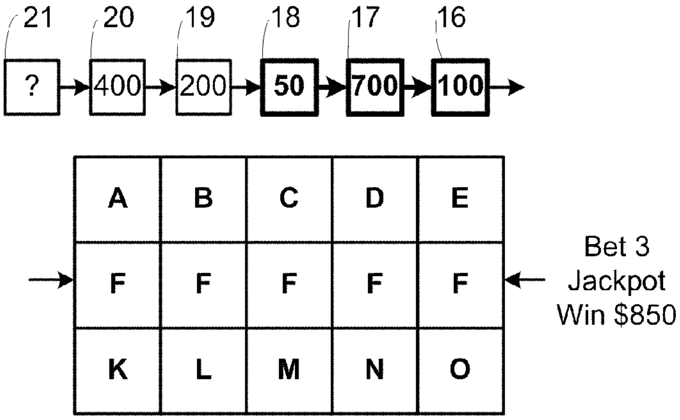
FIG. 3 illustrates that the player achieved a jackpot symbol combination after betting three credits, thus causing the player to be awarded the first three progressive jackpots, along with any conventional award for the jackpot symbol combination.

In FIG. 3, the player has hit a jackpot symbol combination in the primary game. The designer of the game may of course select any symbol combination to be a jackpot win. In the case of FIG. 3, the jackpot win is five of the same type of symbol (in this case F) across an activated payline, in this case a center payline. The number of progressive jackpots won pursuant to the jackpot symbol combination is based upon the number of credits bet by the player for that particular game. In one example, the player may bet anywhere from one to five credits, where the conventional awards for various symbol combinations increase proportionately as the player increases the number of credits bet per game. An added incentive for the player to bet additional credits is that, for a jackpot symbol combination, the player wins as many jackpots as credits bet, starting from right to left in the line of jackpot amounts 16-20. Since it is assumed in FIG. 3 that the player has bet three credits, the player wins the jackpots 16-18, totaling $850. In addition to this combined jackpot amount, the player may also win a conventional award for the five symbols. The jackpot award will typically be provided to the player in the form of credits on a credit meter.

It may be the case that jackpots 19 or 20 become very high. Since jackpots 19 and 20 require a bet of 4 or 5 credits to win, the player has a strong incentive to bet 4 or 5 credits, since a player would normally not obtain more than one jackpot symbol combination during a gaming session.

The presentation of jackpots and the order of jackpots won may take on any form.

Figure 4:
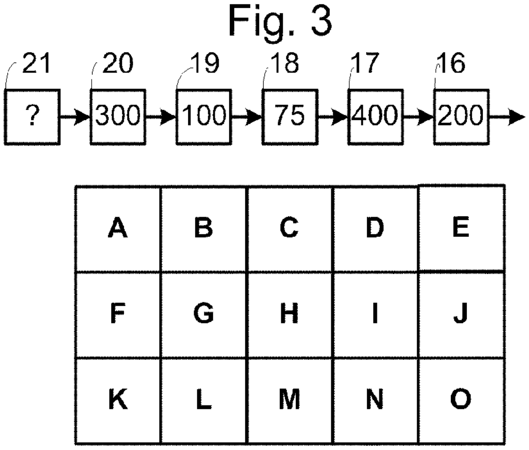
FIG. 4 illustrates how the progressive jackpot amounts shift columns to fill in the jackpots that have just been won by the player.

As seen in FIG. 4, the winning by the player of jackpots 16-18 causes the jackpot amounts to shift three places to the right, so now what was previously jackpot 19 is now jackpot 16. The hidden jackpots (e.g., jackpot 21) are shifted into the jackpots 18, 19, and 20. There may be any number of hidden jackpots.

In one embodiment, the symbols that increase the jackpot amount may be either preselected by the gaming machine or selected by the player. For example, the player may choose a plum symbol to increase a jackpot by a certain amount, such as $25. The plum value may be based on the probability of the plum being displayed. The machine's processor may even change the probability of a jackpot-incrementing symbol occurring in order to generate desired jackpot amounts.

In another embodiment, the train of jackpots 16-20 may shift at predetermined or random times, instead of only when a player wins.

In another embodiment, the triggering event for winning a jackpot is not a known symbol combination but may be a mystery event. For example, a jackpot controller may randomly, or based upon other criteria, select a gaming machine for winning a jackpot. The number of jackpots won by the player may still be based upon the number of credits bet on the game. In another embodiment, a jackpot controller designates one of the gaming machines to display a winning symbol combination at a random time or upon the progressive jackpots exceeding a certain value (either a predetermined value or a randomly chosen value), or based on any other criteria.

Instead of values being displayed on the reels, as in FIG. 2, the values that increment the jackpots can be hidden and represented as question marks (or other suitable icons) on the reels. The player can then touch one of the question marks, using a touch screen, to select which hidden value gets added to the jackpot for that column. Instead of the player choosing, the gaming machine may automatically choose one of the hidden values.

There may be more than five jackpots. For example, each symbol or a subset of the symbols may be associated with a separate jackpot. If a combination of, for example, five of the same symbol is displayed, the player wins the jackpot associated with that symbol. The jackpots may be filled in any manner. In one example, a value displayed on the reels is randomly applied to one of the jackpots, or the values are applied to the jackpots from right to left or left to right. A player may add a jackpot by betting an additional amount.

The jackpot display may be mechanical, such as by using flip cards, wheels, reels, or a belt drive with values printed for display. The jackpots may also be displayed using OLEDs, LEDs, an LCD, or any other type of display means. The main game may also be displayed using mechanical means, such as motor-driven reels.

If the gaming machine is in a bank of interconnected machines with common progressive jackpots, a central jackpot controller may control the various jackpot displays, or one of the gaming machines in the bank may act as a master to control the jackpot function. Instead of the jackpots being displayed on the same screen 10 as the primary game, a centralized jackpot display may be provided for viewing by all players playing the bank of gaming machines.

Accordingly, a game has been described where the player is given an incentive to keep playing the machine, and the player has an incentive to bet an increased number of credits per play in an attempt to win additional progressive jackpots.

Although the invention can be easily implemented by modifying most types of modern gaming machines, one particular gaming machine platform will be described.

Figure 5:
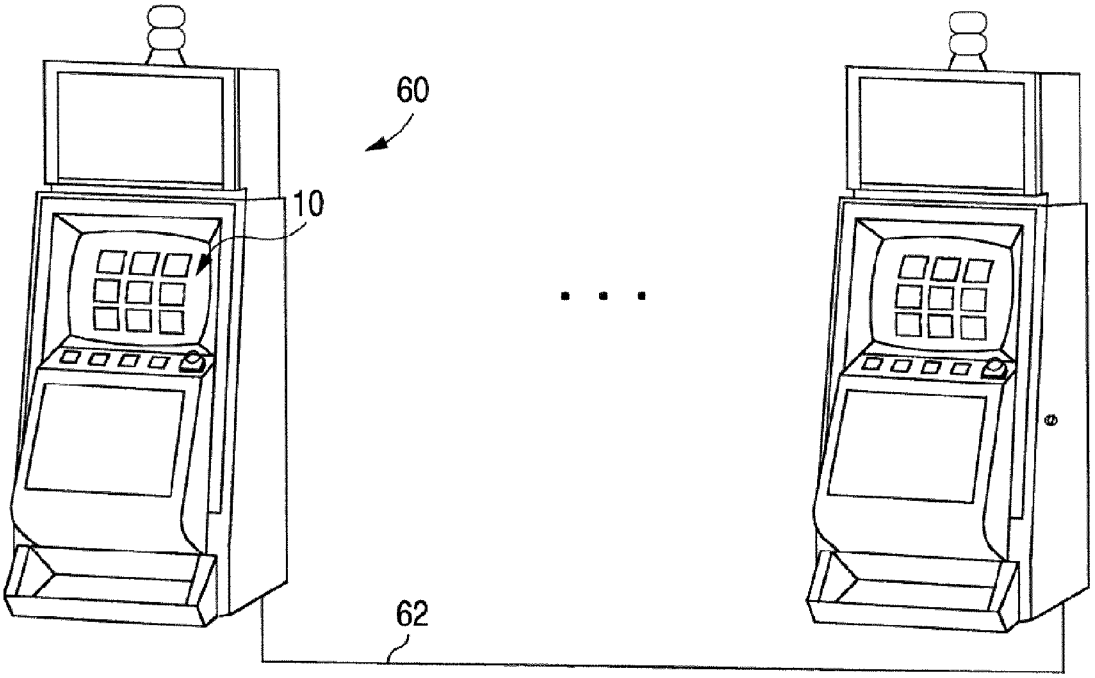
FIG. 5 is a perspective view of conventional video gaming machines that may incorporate the present invention.

A system of linked gaming machines 60 is shown in FIG. 5. The jackpot portion of the system may be controlled by a central jackpot controller. Gaming machines 60 are linked within a communication network by wires 62 or by a wireless connection. The gaming machines 60 may be video types that display the game on a display screen or may be motor-driven reel types where awards are based on combinations of symbols across one or more pay lines. The inventive game may also be performed on a stand-alone machine.

Figure 6:
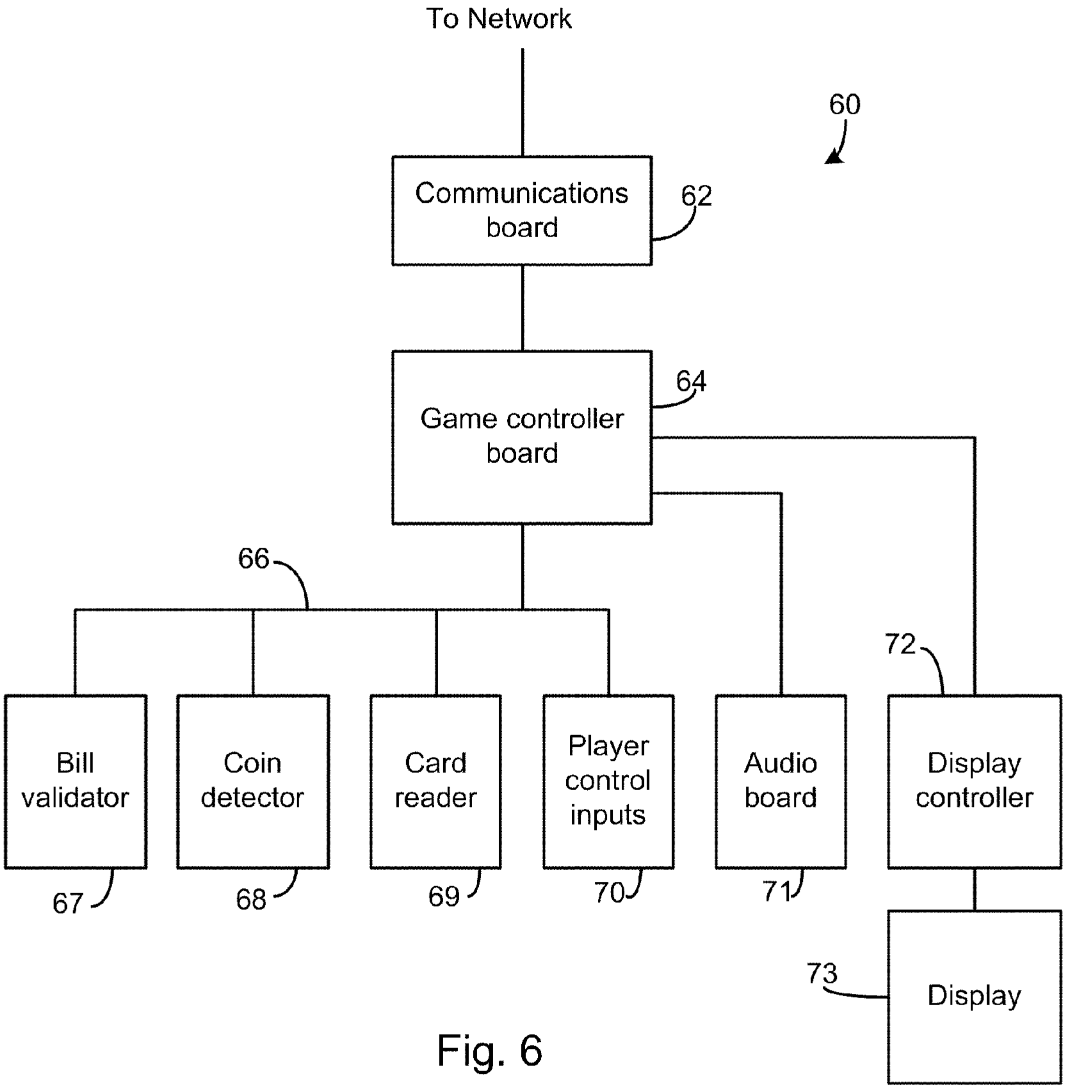
FIG. 6 is a block diagram of various key functional units in a conventional gaming machine programmed to carry out the present invention.

FIG. 6 is a block diagram of one gaming machine 60 that may be linked to other gaming machines and may include software to carry out the inventive game. The gaming machine 60 may use conventional hardware. A communications board 62 may contain conventional circuitry for coupling the gaming machine 60 to a local area network (LAN) or other type of network using Ethernet or any other protocol. The game controller board 64 contains memory and a processor for carrying out programs stored in the memory and for providing the information requested by the network. The game controller board 64 primarily carries out the game routines.

Peripheral devices/boards communicate with the game controller board 64 via a bus 66 using, for example, an RS-232 interface. Such peripherals may include a bill validator 67, a coin detector 68, a smart card reader or other type of credit card reader 69, and player control inputs 70 (such as buttons or a touch screen). An audio board 71 converts coded signals into analog signals for driving speakers. A display controller 72, which typically requires a high data transfer rate, converts coded signals to pixel signals for the display 73. Display controller 72 and audio board 71 may be directly connected to parallel ports on the game controller board 64.

The inventive game may also be played on-line via the Internet, and any suitable computer and display device, such as a home computer or a mobile telephone, may be used to play the game.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. method performed by a gaming device comprising:

generating an outcome of a primary game using a processor, the primary game generating at least one jackpot winning outcome and a plurality of non-jackpot winning outcomes, wherein the primary game comprises randomly displaying, in a single game, a plurality of symbols in at least one row and in N columns, wherein N is at least three, and wherein combinations of symbols across the N columns determine the at least one jackpot winning outcome and the plurality of non-jackpot winning outcomes, and wherein only some of the symbols are jackpot-incrementing symbols, each jackpot-incrementing symbol directly corresponding to a value that increments a jackpot by that value;

simultaneously displaying on a display device a plurality of different progressive jackpots to a player that may be won in a single game, the plurality of different progressive jackpots including a first progressive jackpot;

incrementing the first progressive jackpot by a value identified by at least one of the jackpot-incrementing symbols displayed in the primary game, wherein the different progressive jackpots are incremented at different random rates by the display of different jackpot-incrementing symbols occurring in the at least one row and N columns over a plurality of primary games; and awarding one or more of the progressive jackpots to a player, by crediting a credit meter, in response to a jackpot winning outcome occurring in a current game, wherein a plurality of the progressive jackpots is awarded in a single game after obtaining the jackpot winning outcome if certain conditions are met, and wherein the particular number of progressive jackpots awarded is based on certain conditions other than an outcome of the current game.

2. The method of claim 1 wherein, in the step of awarding one or more of the progressive jackpots to a player, the particular number of jackpots in the plurality of progressive jackpots awarded corresponds to an amount bet by the player for the single game.

3. The method of claim 1 further comprising:

detecting a bet by the player, the bet being one of a plurality of possible bet amounts that can be bet for a single game, the possible bet amounts including a minimum bet and a maximum bet;

wherein awarding one or more of the progressive jackpots to a player comprises awarding a plurality of the progressive jackpots to a player for a jackpot winning outcome in a single game only when a certain bet greater than the minimum bet is detected.

4. The method of claim 1 further comprising storing in memory a plurality of hidden progressive jackpots that cannot be won by a player until displayed to the player, one or more of the hidden progressive jackpots being displayed to the player after at least one of the displayed progressive jackpots is won by the player.

5. The method of claim 1 wherein the jackpot-incrementing symbols display numerical value amounts.

6. The method of claim 5 wherein the jackpot-incrementing symbols display numerical value amounts corresponding to credit values.

7. The method of claim 1 wherein each of the progressive jackpots only corresponds to a particular virtual reel displaying a column of symbols in the N columns of symbols, and a progressive jackpot is only incremented by a jackpot-incrementing symbol if that jackpot-incrementing symbol is displayed in the column corresponding to that progressive jackpot.

8. The method of claim 1 wherein the primary game comprises randomly displaying, in a single game, a plurality of symbols in at least one row and in N columns on reels that rotate and randomly stop.

9. The method of claim 8 wherein the reels are virtual reels.

10. A gaming device comprising:

a display device; and a programmed processor, the programmed processor being programmed to carry out the following method:

generating an outcome of a primary game using a processor, the primary game generating at least one jackpot winning outcome and a plurality of non-jackpot winning outcomes, wherein the primary game comprises randomly displaying, in a single game, a plurality of symbols in at least one row and in N columns, wherein N is at least three, and wherein combinations of symbols across the N columns determine the at least one jackpot winning outcome and the plurality of non-jackpot winning outcomes, and wherein only some of the symbols are jackpot-incrementing symbols, each jackpot-incrementing symbol directly corresponding to a value that increments a jackpot by that value;

simultaneously displaying on a display device a plurality of different progressive jackpots to a player that may be won in a single game, the plurality of different progressive jackpots including a first progressive jackpot;

incrementing the first progressive jackpot by a value identified by at least one of the jackpot-incrementing symbols displayed in the primary game, wherein the different progressive jackpots are incremented at different random rates by the display of different jackpot-incrementing symbols occurring in the at least one row and N columns over a plurality of primary games; and awarding one or more of the progressive jackpots to a player, by crediting a credit meter, in response to a jackpot winning outcome occurring in a current game, wherein a plurality of the progressive jackpots is awarded in a single game after obtaining the jackpot winning outcome if certain conditions are met, and wherein the particular number of progressive jackpots awarded is based on certain conditions other than an outcome of the current game.

11. The device of claim 10 wherein, in the step of awarding one or more of the progressive jackpots to a player, the particular number of progressive jackpots in the plurality of jackpots awarded corresponds to an amount bet by the player for the single game.

12. The device of claim 10 wherein the processor is programmed to carry out the method further comprising:

detecting a bet by the player, the bet being one of a plurality of possible bet amounts that can be bet for a single game, the possible bet amounts including a minimum bet and a maximum bet;

wherein awarding one or more of the progressive jackpots to a player comprises awarding a plurality of the progressive jackpots to a player for a progressive jackpot winning outcome in a single game when a certain bet greater than the minimum bet is detected.

13. The device of claim 10 wherein the processor is programmed to carry out the method further comprising storing in memory a plurality of hidden progressive jackpots that cannot be won by a player until displayed to the player, one or more of the hidden progressive jackpots being displayed to the player after at least one of the displayed progressive jackpots is won by the player.

14. The device of claim 10 wherein the jackpot-incrementing symbols display numerical value amounts.

15. The device of claim 14 wherein the jackpot-incrementing symbols display numerical value amounts corresponding to credit values.

16. The device of claim 10 wherein each of the progressive jackpots only corresponds to a particular virtual reel displaying a column of symbols in the N columns of symbols, and a progressive jackpot is only incremented by a jackpot-incrementing symbol if that jackpot-incrementing symbol is displayed in the column corresponding to that progressive jackpot.

17. A method performed by a gaming device comprising:

detecting a bet by a player, the bet being one of a plurality of possible bet amounts that can be bet for a single game, the possible bet amounts including a minimum bet and a maximum bet;

generating an outcome of a primary game using a processor, the primary game generating at least one jackpot winning outcome and a plurality of non-jackpot winning outcomes, wherein the primary game comprises randomly displaying, in a single game, a plurality of symbols in at least one row and in N columns on a plurality of reels, wherein N is at least three, and wherein combinations of symbols across the N columns determine the at least one jackpot winning outcome and the plurality of non-jackpot winning outcomes;

simultaneously displaying on a display device a plurality of different progressive jackpots to a player that may be won in a single game;

incrementing the plurality of progressive jackpots at different random rates over a plurality of primary games; and awarding one or more of the progressive jackpots to a player, by crediting a credit meter, in response to a jackpot winning outcome occurring in a current game, wherein only a single one of the progressive jackpots is awarded in a single game after obtaining the jackpot winning outcome if the player bet the minimum bet, and wherein a plurality of the progressive jackpots is awarded in a single game after obtaining the jackpot winning outcome if the player bet the maximum bet.

18. The method of claim 17 wherein, in the step of awarding one or more of the progressive jackpots to a player, the particular number of jackpots in the plurality of progressive jackpots awarded corresponds to an amount bet by the player for the single game.

19. The method of claim 17 wherein the reels comprise virtual reels.

20. The method of claim 17 further comprising storing in memory a plurality of hidden progressive jackpots that cannot be won by a player until displayed to the player, one or more of the hidden progressive jackpots being displayed to the player after at least one of the displayed progressive jackpots is won by the player.

21. The method of claim 17 wherein some of the symbols on the reels are jackpot-incrementing symbols, each jackpot-incrementing symbol directly corresponding to a value that increments one of the progressive jackpots by that value.

* * * * *